United States Patent Office 3,493,349
Patented Feb. 3, 1970

3,493,349
EXTRACTION OF BORON FROM BRINES HAVING A pH OF LESS THAN ABOUT 1.7 USING β-ALIPHATIC DIOLS
Carl A. Schiappa, Jr., and John Place, Midland, and Raymond K. Hudson, Caro, Mich., and Robert R. Grinstead, Walnut Creek, Calif., assignors to The Dow Chemical Company, Midland, Mich., a corporation of Delaware
No Drawing. Filed Sept. 28, 1966, Ser. No. 582,484
Int. Cl. B01j 9/06; C01b 35/00
U.S. Cl. 23—312         18 Claims

ABSTRACT OF THE DISCLOSURE

A process for extracting boron from dilute aqueous boron-containing solutions which comprises first acidifying the solution to a pH of less than about 1.7 and subsequently extracting the acidified solution with a water-immiscible β-aliphatic diol and separating the boron-depleted aqueous phase from the boron-containing organic phase.

---

This invention relates to an improved process for recovering the boron values from boron-containing brines and dilute liquors and particularly relates to an improved liquid-liquid extraction process for selectively recovering boron from relatively dilute boron-containing brines and liquors.

The boron values present in many natural and artificial brines and in the dilute liquors from some processes are often present in relatively low concentrations. While it is desirable in many instances to recover these boron values, previous processes have proved difficult and inefficient. In the case of magnesium chloride brines to be used in the production of magnesium hydroxide, magnesium oxide or magnesium metal, it is usually highly advantageous to first purify the magnesium chloride by removing the boron values therefrom. An improved process for selectively removing the boron values from such brines would likewise be advantageous.

It is an object of this invention to provide an improved process for selectively removing boron values from boron-containing brines and liquors. A further object is to provide an improved liquid-liquid solvent extraction process for selectively recovering boron values from boron-containing brines and liquors. These and other objects and advantages of the present process will become apparent from a reading of the following detailed specification.

It has now been discovered that boron values may be selectively removed from boron-containing brines and liquors by acidifying the brine or liquor to a pH of less than about 1.7, contacting the acidified brine or liquor with a water-immiscible aliphatic diol and separating the aqueous phase from the boron-containing organic phase. The boron values are separated from the organic phase and the boron-free aliphatic diol may be used to extract more boron from the boron-containing source material.

The process of this invention is applicable to remove boron values in a recoverable form from substantially any dilute aqueous boron-containing source material, e.g. natural or synthetic brines or a dilute liquor which contains boron values in solution. This process is of particular value in removing the boron values from calcium chloride brines and from magnesium chloride brines to be used as a feed to an electrolytic magnesium cell and to remove the boron values from other magnesium chloride-containing brines such as Monroe brine, Great Salt Lake brine and the like.

In order to achieve the improved rate of extraction of boron which is achieved by the process of this invention, the boron-containing source material is acidified to a pH of less than about 1.7 prior to extraction with a pH of from about 1.6 to about 0.5 being usually preferred. Suitable materials for acidifying the boron-containing source material include hydrochloric acid, sulfuric acid, $HNO_3$ and the like.

After acidification to the desired pH, the acidified boron-containing source material is contacted with a water-immiscible aliphatic diol in a manner such as stirring, shaking, counter-current flow or the like to produce an intimate contact between the aqueous and organic phases. The time of contact between the phases depends upon such factors as the concentration of boron in aqueous phase, the proportion of such boron to be removed, the degree of mixing achieved, upon the particular β-aliphatic diol employed and the like. In general, however, most of the boron-values are extracted into the organic phase in less than about 3 minutes. Volume ratios of organic phase to aqueous phase of 1:100 to 10:1 may be employed but phase ratios of from 1:10 to aobut 10:1 are usually preferred. Suitable β-aliphatic diols for use in the process of this invention include those β-aliphatic diols which are substantially immiscible in water and which contain from about 6 to about 20 carbon atoms preferably from about 8 to about 14 carbon atoms. Examples of such suitable water-immiscible β-aliphatic diols include 2-ethyl-1,3-hexanediol, 3-methyl-2,4-heptane-diol, 2,2,4-trimethyl-1,3-pentanediol, 2-butyl-2-hexyl-1,3-propane diol, 2-methyl-2-nonyl-1,3-propanediol, 2-methyl-2(octylthio)methyl-1,3-propanediol, 2,2-diamyl-1,3-propanediol, 2-butyl-1,3-octanediol, 3-methyl-2,4-undecanediol, 6-ethyl-3,5-decanediol, 5-ethyl-3-methyl-2,4-nonanediol, 2-butyl-2-ethyl-1,3-propanediol and 2,4-diethyl-2-butyl-1,3-octanediol.

It is usually preferred to employ a carrier or solvent for the β-aliphatic diols which is substantially water-immiscible and inert to the extraction system. Virtually any liquid having a miscibility with water of less than about 10 percent by weight and inert to the extraction system may be used if it is a solvent for the β-aliphatic diol to be employed. Sufficient solvent is usually employed to produce 0.02 to 0.5 molar solution of the organic extractant in the solvent. Typical of such solvents are aliphatic hydrocarbons, aromatic hydrocarbons, ethers, chlorocarbons and the like. Mixtures of such solvents may also be employed and in some instances mixed solvents have been found advantageous.

Temperature of the liquids during the extraction step is not critical but a range of from about 10° C. to about 80° C. is generally employed and it is usually most convenient to operate the extraction at or near room temperature.

After sufficient contact between the organic extractant solution and the boron-containing source material, the organic and aqueous phases are allowed to separate. Even with a single stage contact, most of the boron values originally present in the boron-containing source material is solvated by the organic phase and removed from the aqueous phase. Once the discrete layers are formed, separation of the aqueous phase from the organic phase is easily accomplished by drawing off one or both of such layers.

The organic phase, after extraction of the boron-containing source material and separation from the aqueous phase, contains boron values which may be recovered therefrom by any one of several known methods. For example, the more volatile organic extractants may be separated from the boron values by distillation or, as an alternative, the boron-containing organic phase may be washed with an alkaline solution, such as a solution of NaOH, converting the boron values into the borate form and washing such values from the organic phase into the aqueous alkaline phase. The organic extractant may then be reused in the extraction system and the boron value now relatively concentrated, may be separated, reacted or otherwise recovered from the aqueous solution.

The following examples are provided as a more detailed description of various embodiments of the invention but are not to be construed as limiting the scope of the invention.

EXAMPLE 1

Into a 150 ml. beaker was adder 50 ml. of a Monroe brine containing about 19 weight percent $CaCl_2$, 4 weight percent $MgCl_2$, 5 weight percent NaCl and 360 mg./l. of boron. The pH of the brine was adjusted to 0.8 with HCl, 50 ml. of a 0.28 molar solution of 2-butyl-2-hexyl-1,3-propanediol in kerosene was added to the acidified brine and the mixture was stirred rapidly at 60° C. Analysis of the organic and aqueous phase after one minute of stirring showed 88 weight percent of the boron values to have been extracted from the aqueous to the organic phase. After two minutes of stirring, analysis of the phases showed 98.5 weight percent of the boron values had been extracted into the organic phase.

Similar results were obtained when 0.28 molar solutions of 5-ethyl-3-methyl-2,4-nonanediol and 2,2-diamyl-1,3-propanediol were employed as the organic extractants.

As a control, substantially duplicate experiments were conducted with the exception that the brine was not acidified prior to the extraction and therefore had a pH of 3.0. The following results were obtained.

| Extractant | Wt. Percent Boron Extracted into Organic Phase | | | | |
|---|---|---|---|---|---|
| | 1 min. | 2 min. | 4 min. | 10 min. | 20 min |
| 5-ethyl-3-methyl-2,4-nonanediol (0.28 molar in kerosene) | 34 | | 87 | 98 | 99 |
| 2-butyl-2-hexyl-1,3-propanediol (0.28 molar in kerosene) | 31 | 72 | | 94 | 95 |
| 2,2-diamyl-1,3-propane-diol (0.28 molar in kerosene) | 6.5 | 65 | | 94 | 95 |

EXAMPLE 2

Samples of debrominated Monroe brine were acidified with concentrated HCl to various levels of pH. The brine contained about 19 weight percent $CaCl_2$, 4 weight percent $MgCl_2$, 5 weight percent NaCl and about 350 mg. boron/liter of brine. Two volumes of the acidified brine were then mixed with one volume of a solution of 0.12 molar in 2,2,4-trimethyl-1,3-pentanediol in a mixed solvent containing 58 volume percent toluene and 40 volume percent of Alfol 810 (a C8–C10 alcohol). The brine-organic extractant mixture was then vigorously stirred and samples periodically withdrawn to determine the rate of extraction of the boron values from the aqueous brine phase into the organic extractant phase. The results were as follows:

| Brine pH | Percent Boron Extracted in Organic Phase | | | |
|---|---|---|---|---|
| | 0.5 min. | 1.0 min. | 2.0 min. | 3.0 min. |
| 0.5 | 88.5 | 91.6 | 92.3 | 92.3 |
| 1.0 | 86.4 | 90.7 | 92.3 | 92.3 |
| 1.5 | 80.0 | 88.2 | 91.9 | 91.9 |
| 2.0 | 58.6 | 75.0 | 88.4 | 92.3 |
| 2.5 | 50.2 | 67.9 | 83.4 | 91.4 |
| 3.0 | 56.6 | 71.4 | 85.5 | 90.1 |
| 3.5 | 50.8 | 66.4 | 81.2 | 88.2 |

After 5 minutes of stirring, the sample containing brine having a pH of 1.0 was removed from the stirrer and layers were allowed to form. The organic layer was removed from the brine layer and was washed with one volume of an aqueous solution containing about 8.5 weight percent NaOH for each 45 volumes of organic phase to convert the boron values to $NaB_2O_4$. After separation of the phases substantially all of the boron values were found to have been removed from the organic extractant and passed as $NaB_2O_4$ into the aqueous caustic phase. To the boron-containing aqueous caustic solution was added a 20 weight percent solution of $CaCl_2$. Upon stirring, the boron values precipitated as $CaB_2O_4 \cdot 4H_2O$. This material was separated by filtration, washed and dried to give a relatively pure, solid $CaB_2O_4$ product.

Various modifications can be made in the present invention without departing from the spirit or scope thereof for it is understood that we limit ourselves only as defined in the appended claims.

We claim:

1. An improved process for removing boron-containing anions from an acidic dilute aqueous boron-containing source material which comprises contacting an acidified source material having a pH of less than about 1.7 for a contact time of less than about two minutes with a water-immiscible β-aliphatic diol and separating the aqueous phase from the boron-containing organic phase.

2. The process of claim 1 wherein the boron values are recovered from the organic phase.

3. The process of claim 1 wherein the pH of the source material is from about 1.6 to about 0.5.

4. The process of claim 1 wherein the boron-containing source material is a magnesium chloride brine.

5. The process of claim 1 wherein the water-immiscible β-aliphatic diol contains from 6 to 20 carbon atoms.

6. The process of claim 1 wherein the β-aliphatic diol is 2-butyl-1,3-octanediol.

7. The process of claim 1 wherein the β-aliphatic diol is 2-ethyl-1,3-hexanediol.

8. The process of claim 1 wherein the β-aliphatic diol is 3-methyl-2,4-heptanediol.

9. The process of claim 1 wherein the β-aliphatic diol is 2,2,4-trimethyl-1,3-pentanediol.

10. An improved process for recovering boron-containing anions from a dilute aqueous boron-containing source material which comprises acidifying said source material to a pH of less than about 1.7, contacting said acidified source material with a water-immiscible β-aliphatic diol for a time sufficient to extract at least a portion of the boron values into the organic phase, separating the aqueous phase from the organic phase, and recovering the boron-containing anions from the organic phase by washing said organic phase with an aqueous alkaline solution.

11. The process of claim 10 wherein pH of the acidified source material is between about 1.6 and 0.5.

12. The process of claim 10 wherein the boron-containing source material is a calcium chloride brine.

13. The process of claim 10 wherein the β-aliphatic diol is employed as a solution in a water-immiscible solvent.

14. The process of claim 10 wherein the β-aliphatic diol contains from about 8 to about 14 carbon atoms.

15. The process of claim 10 wherein the β-aliphatic diol is 2-butyl-1,3-octanediol.

16. The process of claim 10 wherein the β-aliphatic diol is 2-ethyl-1,3-hexanediol.

17. The process of claim 10 wherein the β-aliphatic diol is 3-methyl-2,4-heptanediol.

18. The process of claim 10 wherein the β-aliphatic diol is 2,2,4-trimethyl-1,3-pentanediol.

References Cited

UNITED STATES PATENTS 2,969,275  1/1961  Garrett _____ 23—312 X
3,111,383  11/1963  Garrett _____ 23—149

NORMAN YUDKOFF, Primary Examiner

S. J. EMERY, Assistant Examiner

U.S. Cl. X.R.

23—59, 149